No. 703,269. Patented June 24, 1902.
G. J. HUTCHINGS.
APPARATUS FOR COOKING FOODS FOR POULTRY, GAME, &c., BY STEAM.
(Application filed June 17, 1901.)
(No Model.)

Witnesses
Inventor
G. J. Hutchings
by
Attorneys.

THE NORRIS PETERS CO., PHOTO-LITHO., WASHINGTON, D. C.

UNITED STATES PATENT OFFICE.

GEORGE JOHN HUTCHINGS, OF LONDON, ENGLAND.

APPARATUS FOR COOKING FOODS FOR POULTRY, GAME, &c., BY STEAM.

SPECIFICATION forming part of Letters Patent No. 703,269, dated June 24, 1902.

Application filed June 17, 1901. Serial No. 64,880. (No model.)

*To all whom it may concern:*

Be it known that I, GEORGE JOHN HUTCHINGS, a subject of His Majesty King Edward VII of Great Britain and Ireland, residing at 94 Clerkenwell road, city of London, in the county of Middlesex, England, have invented certain new and useful Improvements in Apparatus for Cooking Foods for Poultry, Game, and the Like by Steam; and I do hereby declare the following to be a full, clear, and exact description of the invention, such as will enable others skilled in the art to which it appertains to make and use the same.

My invention relates to improvements in apparatus for cooking foods for poultry, game, and the like by steam, whereby such foods may be placed in the apparatus over night and will automatically go on cooking for many hours, so that in the morning they are ready for use. I attain these objects by the apparatus illustrated in the accompanying drawings, in which—

Figure 1:
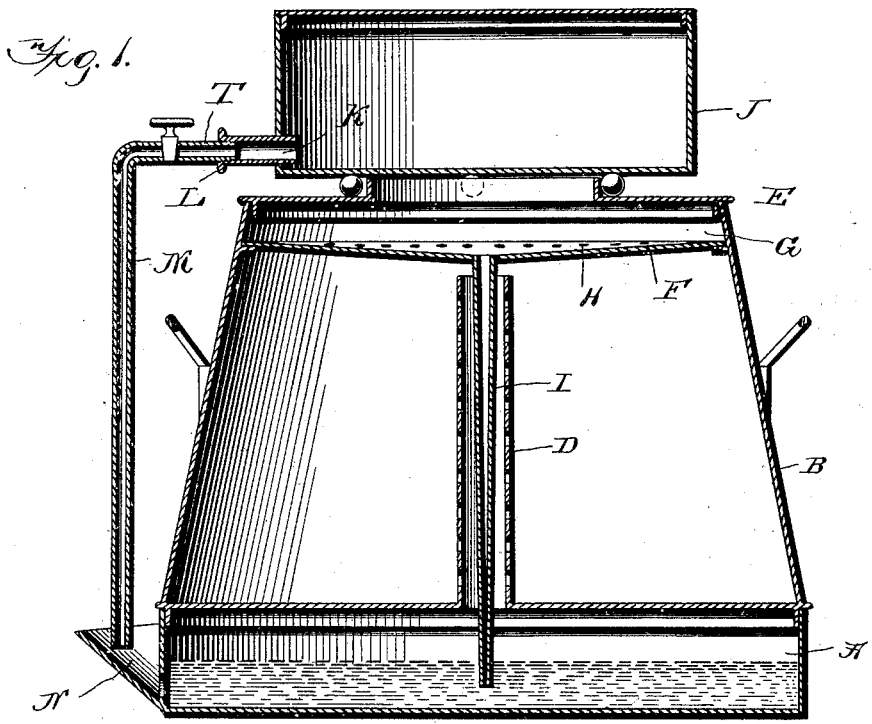
Figure 2:
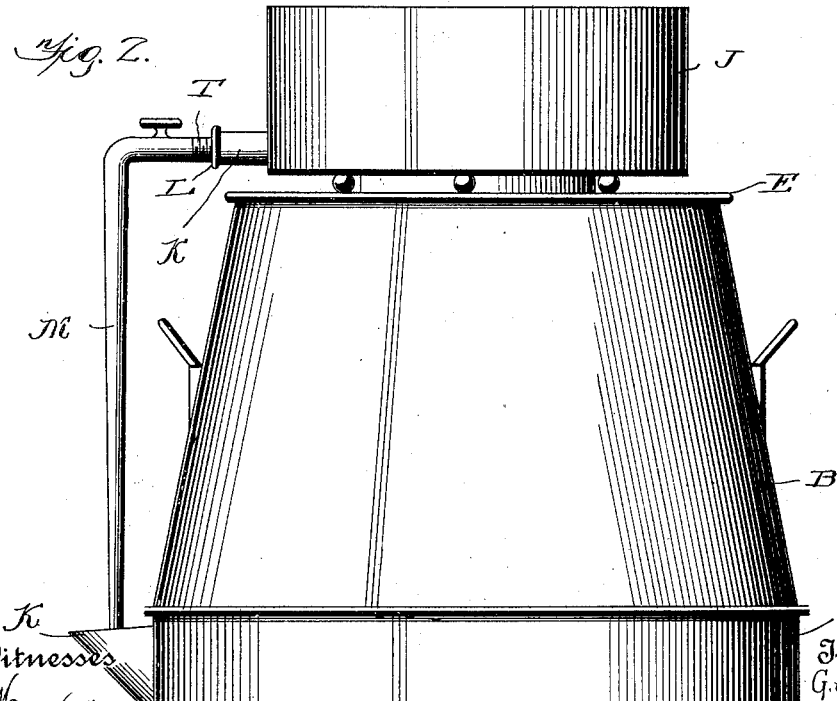

Figure 1 is a vertical section of the entire apparatus. Fig. 2 is a side elevation of the same.

Similar letters refer to similar parts throughout the two views.

The boiler A is arranged to fit over a gas or oil stove and to hold but little water, so that a small supply of heating power is required to keep it boiling.

B is the steamer and food-retainer for the foods. D is a perforated tube fitted to the center of the said steamer, so arranged as to allow the steam from the boiler A to enter the steamer B at all points in order that the food may be cooked as well at the bottom of the vessel as at the top.

The steamer B is provided with an air-tight cover E and a perforated plate F, the space G between the cover and the plate constituting a condenser. The steam passes through the holes H in the plate F and condenses, thence down the pipe I, and hence into the boiler A.

The water-reservoir J is an air-tight vessel resting on the cover E or elsewhere and retains the water for supplying the boiler A. The said reservoir is provided with an orifice K, which is fitted with a screw-socket L, which serves as an expedient for supplying water to the said reservoir. The bent depending pipe M, which is fitted with a tap T, is arranged to screw into the socket L and convey the water from the reservoir J to the boiler A. The flow of the water is regulated by the height of the water in the spout N of the boiler A. When the water in the spout is up to the level of the aperture of the pipe M, the said pipe is closed up against the upward passage of air and prevents the downward flow of water to the spout N. When the water is below the level of the aperture aforesaid, the water flows until it reaches the level thereof, as aforesaid.

What I do claim as my invention, and desire to secure by Letters Patent, is—

The combination of a boiler, a steamer resting thereon and provided with an opening in its bottom, a perforated pipe situated within the steamer and surrounding said opening, a perforated plate supported near the top of the steamer and forming with the sides and cover thereon a condensing-chamber, and a pipe leading from said condensing-chamber and communicating with the boiler below the water-level thereof.

In witness whereof I have hereunto set my hand in the presence of two witnesses.

GEORGE JOHN HUTCHINGS.

Witnesses:
WILLIAM H. BARACLOUGH,
EDITH B. MINSHULL.